US011780117B2

(12) United States Patent
Metzler

(10) Patent No.: US 11,780,117 B2
(45) Date of Patent: Oct. 10, 2023

(54) DEVICE AND METHOD FOR THE PRODUCTION OF PLASTIC PARTS WITH DRYING AND DESSICANT FEED DEVICES

(71) Applicant: HENKEL AG & CO. KGAA, Duesseldorf (DE)

(72) Inventor: Mario Metzler, Lustenau (AT)

(73) Assignee: HENKEL AG & CO., KGaA, Duesseldorf (DE)

( * ) Notice: Subject to any disclaimer, the term of this patent is extended or adjusted under 35 U.S.C. 154(b) by 0 days.

(21) Appl. No.: 16/902,340

(22) Filed: Jun. 16, 2020

(65) Prior Publication Data

US 2020/0307026 A1 Oct. 1, 2020

Related U.S. Application Data

(63) Continuation of application No. PCT/AT2018/060303, filed on Dec. 14, 2018.

(30) Foreign Application Priority Data

Dec. 19, 2017 (AT) .................................. 51048/2017

(51) Int. Cl.
*B29B 7/82* (2006.01)
*B29B 7/24* (2006.01)
(Continued)

(52) U.S. Cl.
CPC .......... *B29B 7/826* (2013.01); *B01F 33/8364* (2022.01); *B29B 7/24* (2013.01);
(Continued)

(58) Field of Classification Search
CPC .. B29B 7/826; B29B 7/24; B29B 7/26; B29B 7/7409; B29B 7/7457; B29B 7/845;
(Continued)

(56) References Cited

U.S. PATENT DOCUMENTS 3,031,273 A * 4/1962 Latinen ................... B01F 27/65
366/147
3,051,455 A * 8/1962 Magester .............. B01F 5/0656
366/172.1
(Continued)

FOREIGN PATENT DOCUMENTS

BR 8506870 A 12/1986
CN 102341435 A 2/2012
(Continued)

*Primary Examiner* — Charles Cooley
(74) *Attorney, Agent, or Firm* — Sun Hee Lehmann

(57) ABSTRACT

A device (1) and method for the production of plastic parts (2), having a first plastic feed device (3a) for feeding a first liquid plastic starting component (K1); a second plastic feed device (3b) for feeding a second liquid plastic starting component (K2); a mixing device (5) with a mixing chamber (6), wherein in the mixing chamber the liquid plastic starting components that can be fed by the plastic feed devices can be mixed to form a plastic mixture (KG); a discharge nozzle (7) for discharging the plastic mixture; and a cooling device (8) for the mixing device, wherein a drying device (9) surrounding the mixing device at least in regions is provided, wherein the drying device has a separating device (10), a drying chamber (T) formed between the separating device and the mixing device, and a desiccant feeding device (11) opening into the drying chamber are disclosed.

9 Claims, 3 Drawing Sheets

(51) Int. Cl.
*B29B 7/26* (2006.01)
*B29B 7/74* (2006.01)
*B01F 33/80* (2022.01)
*B29K 75/00* (2006.01)
*B01F 35/90* (2022.01)

(52) U.S. Cl.
CPC .............. *B29B 7/26* (2013.01); *B29B 7/7409* (2013.01); *B29B 7/7457* (2013.01); *B01F 2035/98* (2022.01); *B29K 2075/00* (2013.01)

(58) Field of Classification Search
CPC ....... B29B 7/7414; B29B 7/407; B29B 7/603; B29B 7/22; B29B 7/58; B29B 7/80; B29B 7/82; B29B 7/823; B29B 7/34; B29B 7/582; B29B 7/7404; B29B 7/7636; B29B 7/7652; B29B 7/84; B29K 2075/00; B05C 5/001; B05C 5/0212; B05C 11/1036; B05C 5/0208; B01F 15/00; B01F 15/0292; B01F 15/066; B01F 15/02; B01F 15/026; B01F 5/0077; B01F 5/0256; B01F 5/0262; B01F 15/00006; B01F 15/00012; B01F 3/223; B01F 13/011; B01F 2013/1097; B29C 44/3442; B29C 44/36
See application file for complete search history.

(56) References Cited

U.S. PATENT DOCUMENTS

| | | | | |
|---|---|---|---|---|
| 3,207,486 | A * | 9/1965 | Rosenthal | B29B 7/7414 366/138 |
| 4,549,915 | A | 10/1985 | Ritschel et al. | |
| 4,803,787 | A | 2/1989 | Amann | |
| 5,766,423 | A | 6/1998 | Smith | |
| 5,958,310 | A | 9/1999 | Pauls | |
| 6,637,926 | B1 * | 10/2003 | Auad | B01F 13/1055 366/168.1 |
| 6,838,496 | B1 | 1/2005 | Goedicke et al. | |
| 10,946,350 | B2 * | 3/2021 | Metzler | B01F 15/065 |
| 11,034,059 | B2 * | 6/2021 | Schwabl | B29B 7/726 |
| 2008/0056064 | A1 | 3/2008 | Tanaka | |
| 2011/0003926 | A1 | 1/2011 | Nogi et al. | |
| 2011/0294978 | A1 | 12/2011 | Diener et al. | |
| 2011/0319518 | A1 | 12/2011 | Kadonaga et al. | |
| 2014/0070438 | A1 | 3/2014 | Huperz et al. | |
| 2015/0176896 | A1 | 6/2015 | Kühnau et al. | |
| 2015/0306552 | A1 | 10/2015 | Erban | |
| 2016/0067735 | A1 * | 3/2016 | Bourbeau | B05B 7/26 222/39 |
| 2017/0065926 | A1 | 3/2017 | Lee et al. | |
| 2018/0178412 | A1 * | 6/2018 | Schwabl | C08G 18/73 |
| 2018/0194037 | A1 * | 7/2018 | Schwabl | B29B 7/726 |
| 2019/0314776 | A1 * | 10/2019 | Metzler | B29B 7/401 |
| 2020/0307026 | A1 * | 10/2020 | Metzler | B05C 5/001 |
| 2022/0088829 | A1 * | 3/2022 | Ill | B01F 27/806 |
| 2022/0088830 | A1 * | 3/2022 | Ill | B29B 7/407 |

FOREIGN PATENT DOCUMENTS

| | | | |
|---|---|---|---|
| CN | 102711939 | A | 10/2012 |
| CN | 104364006 | A | 2/2015 |
| CN | 204414463 | U | 6/2015 |
| CN | 106003458 | A | 10/2016 |
| CN | 106738551 | A | 5/2017 |
| DE | 1155234 | B | 10/1963 |
| DE | 1504654 | A1 | 5/1969 |
| DE | 1953095 | A1 | 4/1971 |
| DE | 19607662 | A1 | 9/1997 |
| DE | 19854689 | A1 | 6/2000 |
| DE | 102012103885 | B4 | 7/2015 |
| EP | 0108167 | A1 | 5/1984 |
| EP | 1036512 | A1 | 9/2000 |
| EP | 2218519 | A1 | 8/2010 |
| GB | 845206 | A | 8/1960 |
| JP | H0353914 | A | 3/1991 |
| JP | H078875 | A | 1/1995 |
| JP | 8-155984 | A | 6/1996 |
| JP | H08156003 | A | 6/1996 |
| JP | 8-187727 | | * 7/1996 ............ B01F 13/002 |
| WO | WO-8302712 | A1 * | 8/1983 |
| WO | 2009063824 | A1 | 5/2009 |
| WO | 2012123280 | A1 | 9/2012 |
| WO | 2016054666 | A1 | 4/2016 |
| WO | 2016141864 | A1 | 9/2016 |
| WO | 2017004635 | A1 | 1/2017 |

* cited by examiner

DEVICE AND METHOD FOR THE PRODUCTION OF PLASTIC PARTS WITH DRYING AND DESSICANT FEED DEVICES

FIELD OF THE INVENTION

The present invention relates to a device for producing plastics parts, in particular adhesive applications, sealing beads, casting parts or the like, comprising a first plastics feed device for feeding a first liquid plastics starting component, a second plastics feed device for feeding a second liquid plastics starting component, a mixing device having a mixing chamber, the liquid plastics starting components which can be fed by the plastics feed devices being mixable in the mixing chamber to form a plastics mixture, a discharge nozzle for discharging the plastics mixture and a cooling device for the mixing device. The invention also relates to a method for operating such a device, comprising the steps of feeding a first liquid plastics starting component and a second liquid plastics starting component to a mixing chamber of a mixing device, mixing the liquid plastics starting components in the mixing chamber to form a plastics mixture, cooling the mixing device using a surrounding cooling device which in particular surrounds the mixing chamber at least in regions, and discharging the plastics mixture through a discharge nozzle.

BACKGROUND OF THE INVENTION

Such devices or such a method are predominantly used to produce adhesive products and adhesive applications. A plastics potting can also be produced. Furthermore, plastics foams, e.g. in the form of sealing beads, can also be produced.

An example of generic prior art can be found in WO 2017/004635 A1. This discloses a device having an intermittently provided liquid plastics component.

In the production of foamed plastics parts in the form of sealing beads that is described in said document, as in the starting position in a possible embodiment of the present invention, a chemical process occurs. The reaction speed of chemical processes usually heavily depends on the temperature at which the processes take place. A rule of thumb is that the reaction speed of the processes approximately doubles when the temperature rises by approx. 10° C. The chemical processes in 2-component mixing heads (corresponds to the mixing device) are also largely subject to this rule.

It is usually desirable for the mass (adhesive, potting, foam) discharged from the mixing heads to harden as quickly as possible such that, for example, the cycle time of the production process can be shortened. For this purpose, special materials are developed which fundamentally have a very high reaction speed. However, these very high reaction speeds cause the reaction process of the two components to progress to a certain point as soon as said components are mixed in the mixing head. This, in turn, quickly leads to contamination and adhesions in the mixing chamber of the mixing head. In addition, waiting times between the doses, owing to the process, can also lead to contamination.

In order to counteract the contamination, there is increased emphasis on the cooling of the mixing heads. In this case, a cooling liquid usually circulates through ducts in the region of the mixing chamber and significantly reduces the temperature locally, in particular the temperature of the mixing chamber walls. Alternatively, contact cooling using thermal-electrical elements is also possible. By means of this measure, the contamination effect can usually be significantly slowed or reduced.

Mixing heads and the mixing chambers thereof are usually made of aluminum or stainless steel. Both are comparatively very good heat conductors, as a result of which not only is the inner region of the mixing head cooled, but the outer surface of the mixing head also approximately assumes the temperature of the cooling liquid.

The minimum achievable mixing head temperature or mixing chamber temperature is mainly limited by the undesirable formation of condensation. If the mixing head is cooled below the dew point of the ambient air, condensation forms on the outside of the mixing head. In extreme cases, the water can even drop onto the component below. Since water can be the driving component in the polyurethane foam reaction, even a single drop can make the component below the mixing head unusable. In many regions of the world, and also in the summer months in Central Europe, the dew point of the ambient air can rise significantly above 20° C. In this case, significant cooling without falling below the dew point is practically impossible.

Two approaches for solving this problem are previously known.

The first approach attempts to measure the dew point and to reduce the cooling power when the dew point is reached. By means of this method, a particularly high cooling power cannot be achieved, in particular in summer.

The second option attempts to isolate the entire surface of the mixing head. In particular in the case of complex mixing heads, the exact shaping of the insulation is complex, since the mixing head should be fully accessible. In addition, increased demands are placed on the insulating material, since moisture penetration (a sponge effect) occurs in open-pore materials, for example, which in turn leads to a reduction in the insulation effect. In addition, a simple cleaning of the insulation using solvents, for example, has to be possible, since external contamination often occurs during industrial use of the insulated mixing head.

SUMMARY OF THE INVENTION

The problem addressed by the present invention is therefore that of providing an improved device for producing plastics parts. The problems listed above are to be solved in particular. This means that a high cooling power should be achieved with little or no condensation being formed.

This is solved by a device having the features of claim 1. According to the invention, a drying device which at least partially surrounds the mixing device is provided, the drying device having a separating device, a drying chamber formed between the separating device and the mixing device, and a desiccant feed device opening into the drying chamber. In other words, an atmosphere is created around the cooled mixing device (mixing head), in which atmosphere the dew point is as low as possible, and therefore no condensation forms on the surface of the mixing device at all. The separating device primarily functions as a guide device for the drying agent, which guides or conveys the desiccant along the surface of the mixing device. For this reason, the separating device can be air-permeable to a certain extent or even have gaps, as long as there is still an overall guiding effect. In the simplest case, the separating device can consist of a material. The separating device is preferably substantially impermeable to gas.

Preferred embodiments of the present invention are also specified in the dependent claims.

In general, it is possible for a protective gas (e.g. argon or nitrogen) to be used as the desiccant and fed by the desiccant feed device. Air, in particular compressed air, is preferably used as the desiccant, however. Compressed air can particularly preferably be introduced into the drying chamber, preferably continuously, by means of the desiccant feed device. Above all, the low dew point of the gas or air is important. In order to avoid the formation of condensation and at the same achieve a good cooling power, the desiccant, preferably in the form of compressed air or in the form of a protective gas, preferably has a dew point below 10° C., preferably below 5° C.

Furthermore, the desiccant feed device preferably has a desiccant source, preferably a compressed air generating device, and a feed element connected to the desiccant source. In addition, the feed element is preferably directed toward a lower region of the mixing device, preferably onto the discharge nozzle. However, the feed element can also be formed in the mixing head such that the desiccant flows out of the mixing head into the drying chamber. A corresponding duct can therefore be formed in the mixing head.

In general, the device has a longitudinal axis. This longitudinal axis preferably substantially coincides with the direction of discharge of the mixture of plastics material and gas.

The separating device can be of any design as long as a desired atmosphere is ensured in the majority of the drying chamber. For example, separating devices that are pocket-shaped, trough-shaped, cap-shaped, shell-shaped or dome-shaped are particularly suitable. With regard to the specific shape of the separating device, the separating device preferably has a base region which separates the drying chamber from the surroundings in the axial direction, and a lateral region connected to the base region, which separates the drying chamber from the surroundings in the radial direction. The axial direction and the radial direction each relate to the longitudinal axis of the device.

According to a preferred embodiment, the lateral region completely surrounds the mixing device in the radial direction. Alternatively, the separating device can also have slots or gaps, e.g. in the lateral region, such that the introduced desiccant can also escape again.

The separating device does not have to hermetically enclose the region around the mixing device. Rather, the separating device is preferably open to the surroundings in an opposing region facing away from the base region.

The separating device is preferably closed off from the surroundings in the lower base region arranged in the region of the discharge nozzle. It is preferably provided that the separating device has an opening which is preferably arranged centrally in the base region, through which opening the discharge nozzle projects. If said opening also has a connection to the drying chamber, dry air flows along the nozzle and also dries said nozzle.

The cooling device should be designed such that there is a sufficient cooling effect in the mixing chamber. For example, the cooling device can be designed in the form of a contact cooling system. However, the cooling device preferably has at least one cooling duct which is preferably undulating or zigzag-shaped and is formed in a housing of the mixing device. By way of example, reference is made to DE 10 2012 103 885 B4 as a possible form of the cooling duct. Generally, a coolant, preferably a cooling liquid, flows in the cooling duct.

The separating device can be formed from the same material as the mixing device, i.e. from metal (e.g. aluminum). For a cheaper and less complex embodiment, however, the separating device preferably consists mostly of a flexible, preferably fiber-reinforced, plastics material or of a rigid plastics material. For this purpose, the plastics material of the separating device preferably contains polyamide, polyethylene or polypropylene. In general, an insulating filling material is advantageous because it is more energy-efficient and there is less risk of condensation forming on the outside of the dome.

According to a preferred embodiment, the plastics feed devices are each connected to a plastics material source. Plastics starting components can be plastics precursors or can themselves already be plastics materials. Polyol, isocyanate, silicone, epoxy resin, MS polymers, adhesive components, booster paste, or the like is preferably used as the first and/or second plastics starting component.

In particular if a foamed product is also to be produced, according to a preferred embodiment, a gas feed device for feeding gas to the first liquid plastics starting component, to the second liquid plastics starting component or to the plastics mixture can be provided, said gas feed device being connected to a gas source.

The problem according to the invention is also solved by a method in which the step of drying the mixing device using a drying device which at least partially surrounds the mixing device is provided, the drying device having a separating device, a drying chamber formed between the separating device and the mixing device, and a desiccant feed device opening into the drying chamber.

Compressed air used in industry usually has a dew point below 5° C. and is therefore usually significantly drier than the ambient air. There is sufficient compressed air in most industrial production plants. In order to be able to carry out the drying as cheaply as possible, the appropriate devices in the system should already be used. For this reason, between 100 and 500 standard liters are preferably introduced into the drying chamber per hour by a compressed air generating device of the drying device. A compressed air generating device which is also used for other purposes can therefore be used for the drying device (exhaust air from valves can also be used). Since the manufacturing costs of compressed air are relatively low (the literature refers to 2.5 cent/$m^3$), the costs of the compressed air used are practically irrelevant in combination with the low air consumption of the drying device, of less than half a cubic meter per hour. Theoretically, locally dried air could also be generated, e.g. by means of granulate or a small membrane dryer, as a result of which a connection to a compressed air network would not be necessary.

In summary, it can be stated that the drying is achieved by a separating device enclosing the mixing device in order to generate a relatively dry atmosphere. In particular, the mixing head is covered by a kind of upside-down dome in the cooled region. Said dome does not have to be particularly close fitting or extremely tight (condensation is not collected by the dome). A very small stream of dried compressed air (said air can also be dried air without high pressure, which is introduced, for example, by means of a fan) is introduced into said dome (a few standard liters per minute). This creates an atmosphere in the cooled region that differs significantly from the moist ambient air, in particular with regard to the dew point. The excess compressed air in particular flows out at the upper opening of the dome. If the air flow is minimized, a kind of insulating layer forms around the mixing head that further increases the effectiveness of the cooling.

BRIEF DESCRIPTION OF THE DRAWINGS

Further details and embodiments of the present invention are explained in more detail below with reference to the description of the drawings and to the embodiments shown in the drawings, in which.

DETAILED DESCRIPTION OF THE INVENTION

Figure 1:
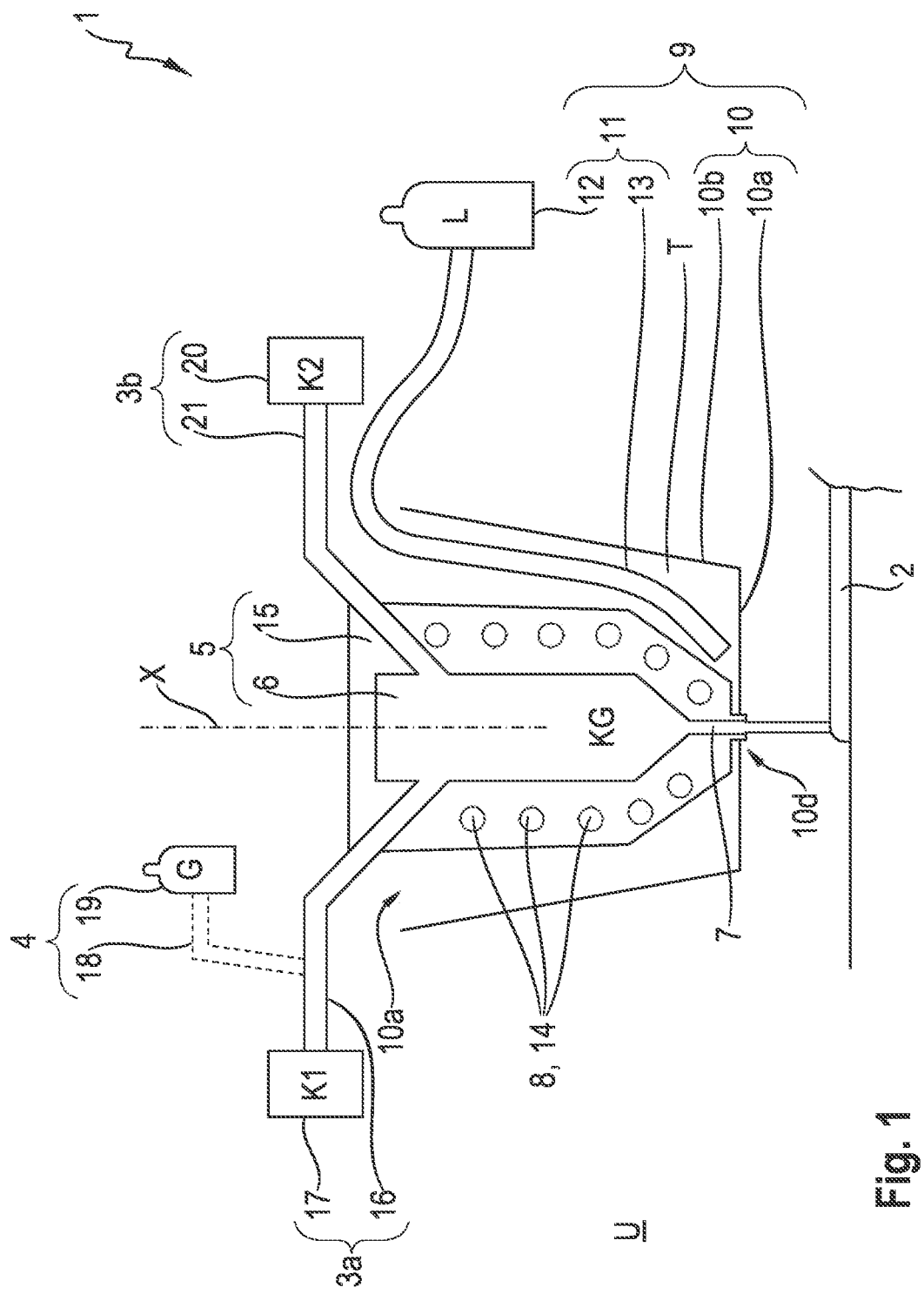
FIG. 1 is a schematically shown cross section through the device.

In FIG. 1, a device 1 for producing plastics parts 2 is shown in a schematic cross section. Specifically, the foamed plastics part 2 in this case is a sealing bead. The device 1 has the mixing device 5 as an essential component. The mixing device 5 has a, preferably metal, housing 15 in which a mixing chamber 6 is formed. A cooling duct 14 of the cooling device 8 is formed in the housing 15 of said mixing device 5. In the illustrated embodiment, the cooling duct 14 is helical (spiraled) around the longitudinal axis X. The cooling duct 14 can also be undulating. The cooling duct 14 is connected to a coolant source (not shown). A cooling liquid such as cooling water, oil, glycol-water mixture, alcohol or the like can be used as the coolant. A line 16 of the first plastics feed device 3a opens into the mixing chamber 6. The first plastics feed device 3a is connected to a source 17 for a first liquid plastics starting component K1. Gas G from a gas source 19 can be fed into the first plastics feed device 3a via a line 18 shown by a dashed line. The gas G can also be introduced directly into the mixing chamber 6, however. The line 18, together with the gas source 19, forms the gas feed device 4. The second plastics feed device 3b has a source 20 for a second liquid plastics starting component K2, and a line 21. The line 21 opens into the mixing chamber 6 of the mixing device 5. In the mixing chamber 6, the first liquid plastics starting component K1 mixes with the second liquid plastics starting component K2 to form the plastics mixture KG (gas G also possibly being contained). A discharge nozzle 7 is formed in the housing 15 of the mixing device 5. The plastics part 2 is produced by discharging the plastics mixture KG. When a plastics mixture KG (in the form of a mixture of plastics material and gas) is discharged from the discharge nozzle 7, the gas G foams up, resulting in a foamed plastics part 2. In general, dynamic mixing (with a stirrer), static mixing or high-pressure mixing can be carried out using the mixing device 5.

When the introduced components are mixed, a chemical reaction occurs in which heat is released (in the case of dynamic mixing, a significant portion of the heat is generated by the stirring energy). In order to prevent an excessive and premature reaction from already taking place in the mixing chamber 6, the cooling device 8 which surrounds the mixing chamber 6 is provided. When the cooling device 8 cools the mixing device 5 (in particular the mixing head) to a temperature which is below the dew point temperature of the surroundings U, condensation forms on the surface of the mixing device 5. This condensation can drip onto the produced plastics part 2 and damage the plastics part 2 as a result.

In order to prevent this, a drying device 9 is provided. Said drying device 9 has a separating device 10 (which is preferably substantially impermeable to gas), a desiccant feed device 11 (in the form of a feed element 13, including a desiccant source 12) and a drying chamber T between the separating device 10 and the surface of the mixing device 5. In the embodiment shown, the separating device 10 has a base region 10a axially defining the drying chamber T, and a lateral region 10b radially defining the drying chamber T. The desiccant source 12 is in the form of a compressed air generating device. Compressed air L is introduced by said compressed air generating device via the tubular feed element 13 into the drying chamber T enclosed by the separating device 10. In contrast to the view in FIG. 1, the outlet opening of the feed element 13 can also be arranged in the region of the upper opening of the separating device. In order to prevent the formation of condensation, it is sufficient if approx. 100 to 500 standard liters of compressed air L are introduced into the drying chamber T per hour. This results in a dew point temperature of approx. 5° C. in the drying chamber T. The introduced desiccant can gradually escape via the opposing region 10c which is open to the surroundings U (or via other openings). A central opening 10d is formed in the base region 10. The tip of the discharge nozzle 7 projects through said central opening 10d in the axial direction. The separating device 10 can consist of a rigid or solid plastics material. Alternatively, the separating device 10 can also consist of a relatively soft material, a film, metal, etc. The separating device 10 is preferably releasably connected to the mixing device 5. In the embodiment according to FIG. 1, the separating device 10 can be releasably connected to the mixing device 5 by being fitted on. This fitted connection (not shown) can be provided, for example, in the region of the discharge nozzle 7 or also in the region of the mixing device 5 that faces away from the nozzle.

Figure 2:
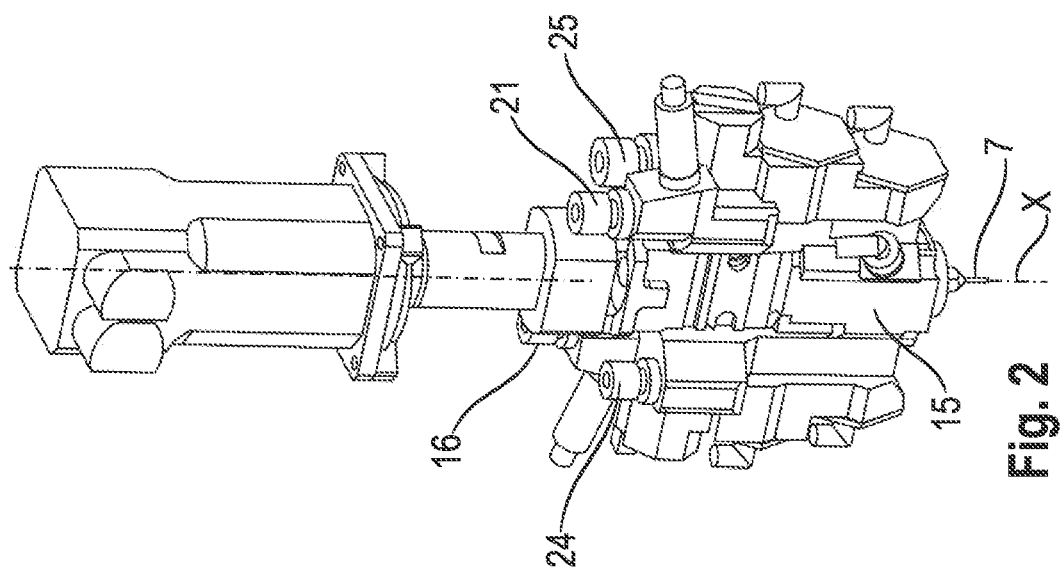
FIG. 2 is a perspective view of the mixing device without a separating device.

In FIG. 2, the device 1 is shown in a perspective view. The line 16 (supply) of the first plastics feed device 3a can be seen on the left-hand side. A corresponding return flow 24 is also provided. The line 21 (supply) of the second plastics feed device 3b is shown in the right-hand region. A corresponding return flow 25 is also provided. The feed line 22 (or the port thereof) of the cooling device 8 is shown in the right-hand region. Coolant is conducted into the cooling ducts 14 via a feed line 22 (not shown). The surface of the housing 15 of the mixing device 5 can also be seen. The feed element 13 of the desiccant feed device 11 is not shown. For example, an air duct can pass through the mixing head and exit, for example, on the underside thereof, which air duct then forms the feed element 13.

Figure 3:
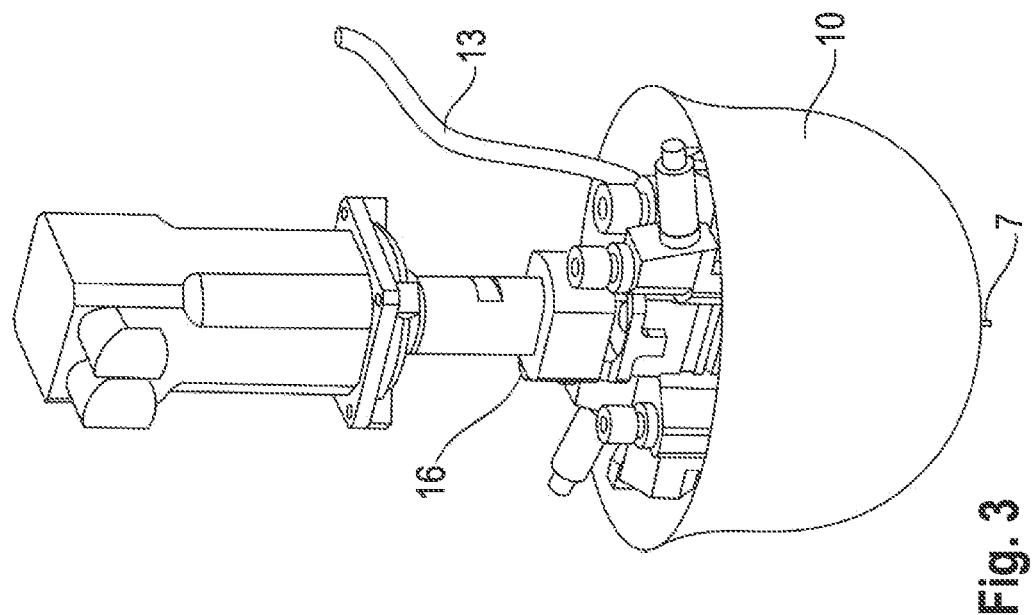
FIG. 3 is a perspective view of the mixing device with a separating device.

FIG. 3 is the same perspective view of the device 1, in which the mixing device 5 is enclosed by the separating device 10 of the drying device 9. It can be seen that the separating device 10 is designed in the form of a dome. Said separating device 10 consists of a flexible plastics material. The separating device 10 of the drying device 9 is held on components of the device 1 by connecting elements (not shown), for example in the form of connecting straps or snap elements. The discharge nozzle 7 protrudes axially in the base region 10a of the separating device 10. In this case, the tubular feed element 13 leads from above into the drying chamber T.

Figure 4:
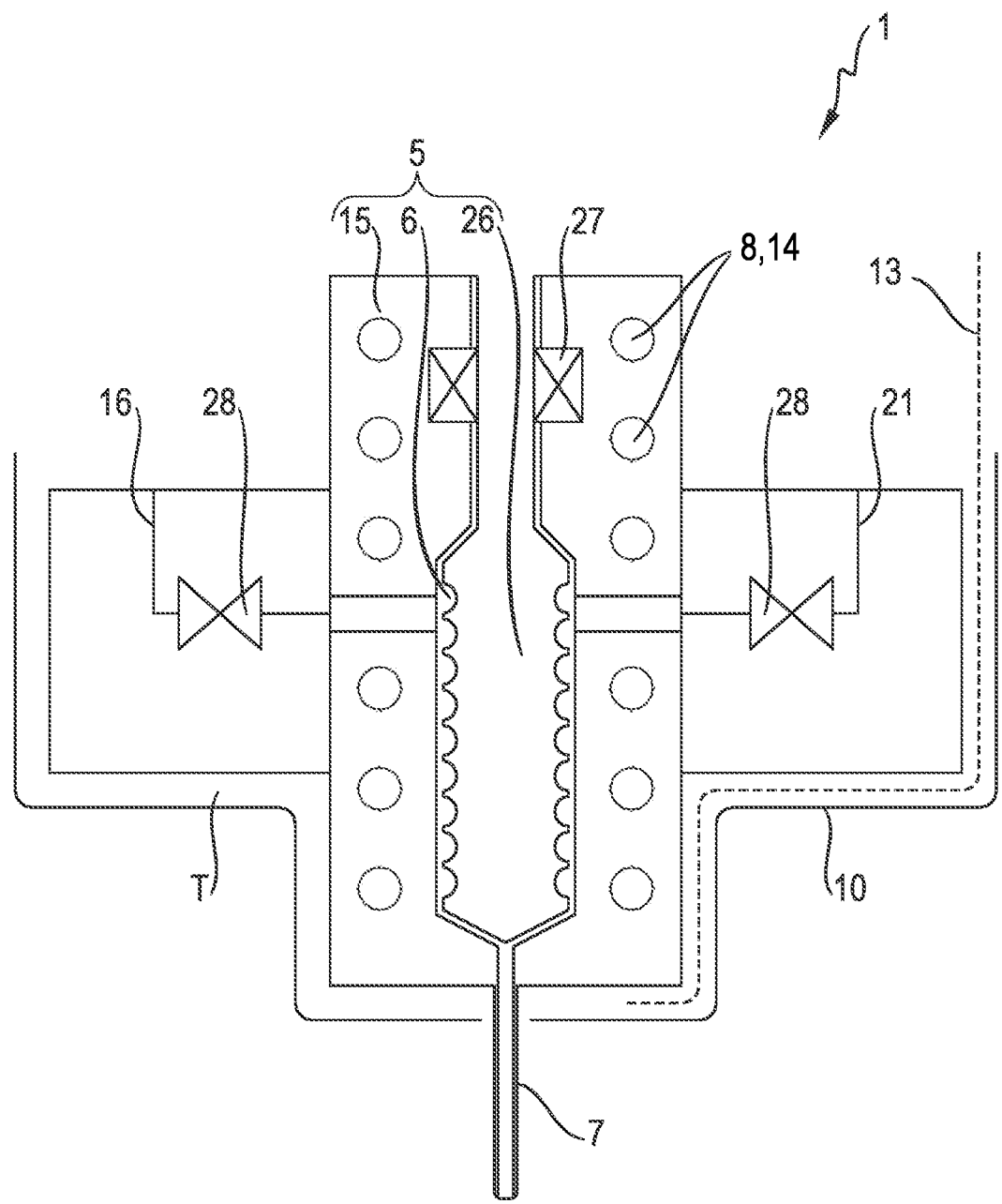
FIG. 4 schematically shows a cross section through a device.

FIG. 4 schematically shows a cross section through a device 1 for producing plastics parts 2. In this embodiment, in addition to the mixing chamber 6 and the housing 15, the mixing device 5 also has a stirrer 26. A seal 27 is arranged between the stirrer 26 and the housing 15. FIG. 4 therefore shows a dynamic mixer. A valve 28 is arranged in each of the lines 16 and 21. Said valves 28 are designed to control the feed of the plastics starting components K1 and K2. The separating device 10 surrounds the mixing device 5. In this case, the separating device 10 is designed to follow the contour of the mixing device 5. This means that the distance between the separating device 10 and the surface of the mixing device 5 can (as in the case shown) be substantially constant. Due to the irregular surface of the mixing device 5, however, the separating device 10 is usually not spaced apart from the surface of the mixing device 5 uniformly throughout. Specifically, a gap which forms the drying chamber T is formed between the separating device 10 and the surface of the mixing device 5. Said gap can be between 0 mm and 100 mm, preferably between 0.3 mm and 5 mm, wide. The schematically indicated feed element 13 for the desiccant leads into the drying chamber T.

LIST OF REFERENCE SIGNS 1 device
2 plastics parts
3a first plastics feed device
3b second plastics feed device
4 gas feed device
5 mixing device
6 mixing chamber
7 discharge nozzle
8 cooling device
9 drying device
10 separating device
10a base region
10b lateral region
10c opposing region
10d opening
11 desiccant feed device
12 desiccant source
13 feed element
14 cooling duct
15 housing
16 line
17 source
18 line
19 gas source
20 source
21 line
24 return flow first component
25 return flow second component
26 stirrer
27 seal
28 valves
K1 first liquid plastics starting component
K2 second liquid plastics starting component
G gas
KG plastics mixture
T drying chamber
L compressed air
X longitudinal axis
U surroundings

The invention claimed is:

1. A device (1) for producing plastics parts (2), comprising
a first plastics feed device (3a) for feeding a first liquid plastics starting component (K1),
a second plastics feed device (3b) for feeding a second liquid plastics starting component (K2),
a mixing device (5) having a mixing chamber (6), the liquid plastics starting components (K1, K2) which can be fed by the plastics feed devices (3a, 3b) being mixable in the mixing chamber (6) to form a plastics mixture (KG) from the mixing device (5),
a discharge nozzle (7) for discharging the plastics mixture (KG), and
a cooling device (8) for the mixing device (5), characterized by
a drying device (9) surrounding the mixing device (5) at least in regions, the drying device (9) comprising a separating device (10), a drying chamber (T) formed between the separating device (10) and the mixing device (5), and a desiccant feed device (11) for feeding a desiccant opening into the drying chamber (T),
wherein the desiccant feed device (11) has a desiccant source (12), a compressed air generating device, and a tubular or pipe-shaped feed element (13) which is connected to the desiccant source (12), and
the tubular or pipe-shaped feed element (13) is directed toward the discharge nozzle (7).

2. The device according to claim 1, characterized in that compressed air (L) is introduced continuously by the desiccant feed device (11).

3. The device according to claim 1, characterized in that the desiccant, in the form of compressed air (L) or in the form of a protective gas, has a dew point of below 10° C.

4. The device according to claim 1, characterized in that the separating device (10) has a base region (10a) that has an opening (10d) which is arranged centrally in the base region (10a), through which opening the discharge nozzle (7) projects.

5. The device according to claim 1, characterized in that the cooling device (8) has at least one cooling duct (14) which is undulating and formed in a housing (15) of the mixing device (5).

6. The device according to claim 1, characterized in that the separating device (10) is made of a fiber-reinforced plastics material or a rigid plastics material.

7. The device according to claim 6, characterized in that the fiber-reinforced plastics material or the rigid plastics material of the separating device (10) contains polyamide, polyethylene or polypropylene.

8. The device according to claim 1, characterized by a gas feed device (4) for feeding gas (G) to the first liquid plastics starting component (K1), to the second liquid plastics starting component (K2) or to the plastics mixture (KG).

9. A device (1) for producing plastics parts (2), comprising
a first plastics feed device (3a) for feeding a first liquid plastics starting component (K1),
a second plastics feed device (3b) for feeding a second liquid plastics starting component (K2),
a mixing device (5) having a mixing chamber (6), the liquid plastics starting components (K1, K2) which can be fed by the plastics feed devices (3a, 3b) being mixable in the mixing chamber (6) to form a plastics mixture (KG) from the mixing device (5),
a discharge nozzle (7) for discharging the plastics mixture (KG), and
a cooling device (8) for the mixing device (5),
wherein the device has a longitudinal axis (X);
characterized
by a drying device (9) surrounding the mixing device (5) at least in regions, the drying device (9) comprising a separating device (10), a drying chamber (T) formed between the separating device (10) and the mixing device (5), and a desiccant feed device (11) opening into the drying chamber (T), wherein the separating device (10) has a base region (10*a*) which separates the drying chamber (T) from a surrounding area (U) in the axial direction, and a lateral region (10*b*) connected to the base region (10*a*), which separates the drying chamber (T) from the surrounding area (U) in the radial direction and the separating device (10) is open to the surrounding area (U) in an opposing region (10*c*) facing away from the base region (10*a*), and the lateral region (10*b*) surrounds the mixing device (5) in the radial direction.

* * * * *